US008934780B2

(12) United States Patent
Yu

(10) Patent No.: US 8,934,780 B2
(45) Date of Patent: Jan. 13, 2015

(54) DIRECT DETECTION OF OPTICAL ORTHOGONAL FREQUENCY DIVISION MULTIPLEXING (OFDM) SIGNALS

(71) Applicant: ZTE (USA) Inc., Morristown, NJ (US)

(72) Inventor: Jianjun Yu, Basking Ridge, NJ (US)

(73) Assignee: ZTE (USA) Inc., Morristown, NJ (US)

( * ) Notice: Subject to any disclaimer, the term of this patent is extended or adjusted under 35 U.S.C. 154(b) by 86 days.

(21) Appl. No.: 13/710,428

(22) Filed: Dec. 10, 2012

(65) Prior Publication Data

US 2013/0148971 A1 Jun. 13, 2013

Related U.S. Application Data

(60) Provisional application No. 61/569,203, filed on Dec. 9, 2011.

(51) Int. Cl.
| | | |
|---|---|---|
| H04B 10/00 | (2013.01) | |
| H04J 14/06 | (2006.01) | |
| H04J 11/00 | (2006.01) | |
| H04J 14/00 | (2006.01) | |
| H04L 27/26 | (2006.01) | |

(52) U.S. Cl.
CPC ............... *H04J 11/00* (2013.01); *H04J 14/00* (2013.01); *H04L 27/2613* (2013.01); *H04L 27/2662* (2013.01); *H04L 27/2692* (2013.01); *H04L 27/2697* (2013.01)
USPC .............................. 398/152; 398/65; 398/154

(58) Field of Classification Search
CPC ....... H04B 10/532; H04J 14/06; H04Q 11/04; H04Q 11/0414
USPC ...................... 398/65, 152, 154, 79
See application file for complete search history.

(56) References Cited

U.S. PATENT DOCUMENTS

| | | | | |
|---|---|---|---|---|
| 7,715,484 | B2* | 5/2010 | Chen et al. ................... | 375/260 |
| 8,000,398 | B2* | 8/2011 | Pan et al. ..................... | 375/260 |
| 8,559,481 | B2* | 10/2013 | Sapozhnykov et al. ........ | 375/146 |
| 2012/0321318 | A1* | 12/2012 | Xu et al. ........................ | 398/76 |

OTHER PUBLICATIONS

Armstrong, J., "OFDM for Optical Communications," Journal of Lightwave Technology, 27(3):189-204, Feb. 2009.
Cao, Z., et al., "Direct-Detection Optical OFDM Transmission System Without Frequency Guard Band," IEEE Photonics Technology Letters, 22(11):736-738, Jun. 2010.
Gudmundson, M., et al., "Adjacent Channel Interference in an OFDM System," IEEE 46th Vehicular Technology Conference, Mobile Technology for the Human Race, Atlanta, GA, pp. 918-922, Apr.-May 1996.
Kim, T., et al., "A Fast Burst Synchronization for OFDM Based Wireless Asynchronous Transfer Mode Systems," Global Telecommunications Conference—Globecom'99, pp. 543-548, Dec. 1999.

(Continued)

*Primary Examiner* — Dalzid Singh
(74) *Attorney, Agent, or Firm* — Perkins Coie LLP

(57) ABSTRACT

Techniques for timing synchronization in an optical orthogonal frequency division multiplexing (OOFDM) system includes providing a time-domain training symbol having a symmetric distribution and producing the training symbol by transmitting a real-valued PN sequence on each subcarrier under the OOFDM. The training sequence includes an initial value, followed by an odd length palindromic sequence of values.

20 Claims, 11 Drawing Sheets

(56) References Cited

OTHER PUBLICATIONS

Minn, H., et al., "On Timing Offset Estimation for OFDM Systems," IEEE Communications Letters, 4(7):242-244, Jul. 2000.

Moose, P.H., "A Technique for Orthogonal Frequency Division Multiplexing Frequency Offset Correction," IEEE Transactions on Communications, 42(10):2908-2914, Oct. 1994.

Park, B., et al., "A Novel Timing Estimation Method for OFDM Systems". IEEE Communications Letters, 7(5):239-241, May 2003.

Pollet, T., et al., "BER Sensitivity of OFDM Systems to Carrier Frequency Offset and Wiener Phase Noise," IEEE Transactions on Communications, 43(2-4):191-193, Feb.-Apr. 1995.

Schmidl, T.M., et al., "Robust Frequency and Timing Synchronization for OFDM," IEEE Transactions on Communications, 45(12):1613-1621, Dec. 1997.

Shieh, W., "PMD-Supported Coherent Optical OFDM Systems," IEEE Photonics Technology Letters, 19(3):134-136, Feb. 2007.

Van De Beek, J.-J., et al., "ML Estimation of Time and Frequency Offset in OFDM Systems," IEEE Transactions on Signal Processing, 45(7):1800-1805, Jul. 1997.

* cited by examiner

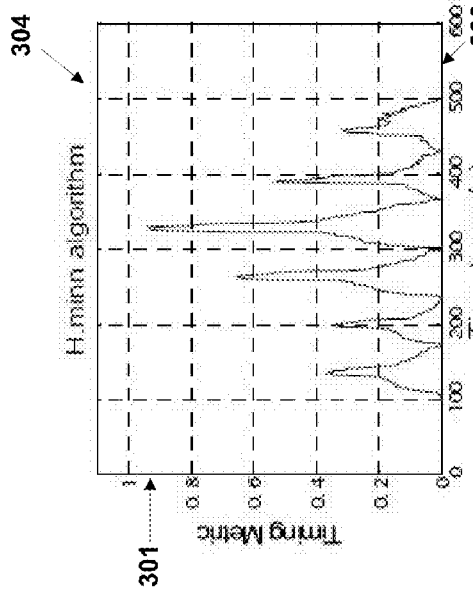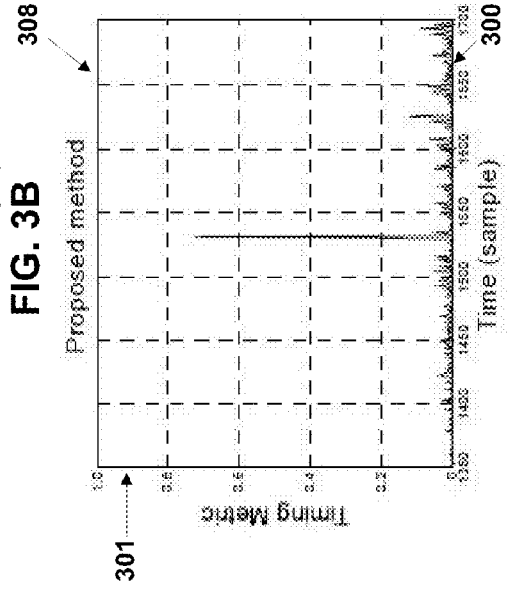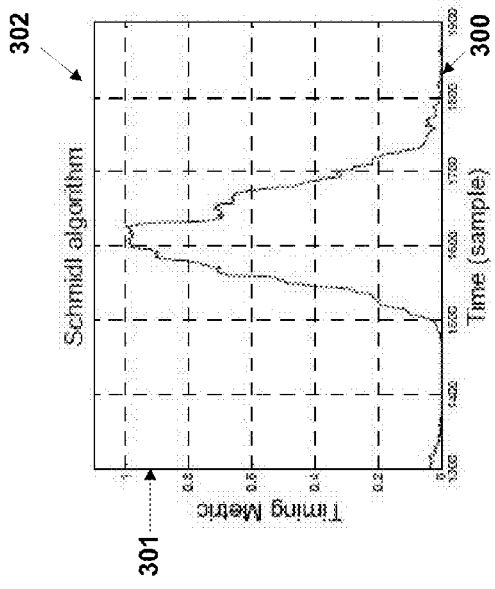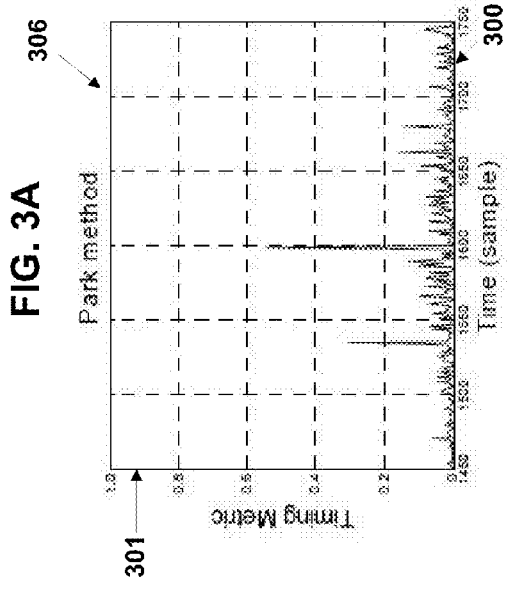

DIRECT DETECTION OF OPTICAL ORTHOGONAL FREQUENCY DIVISION MULTIPLEXING (OFDM) SIGNALS

CROSS REFERENCE TO RELATED APPLICATIONS

This patent document claims the benefit of priority of U.S. Provisional Patent Application No. 61/569,203, filed on Dec. 9, 2011. The entire content of the before-mentioned patent application is incorporated by reference as part of this document.

BACKGROUND

This patent document relates to optical communications.

SUMMARY

The disclosed techniques are useful in achieving fast and accurate synchronization in optical orthogonal frequency division multiplexing (OOFDM) communications.

In one exemplary aspect, a method for timing synchronization in an OOFDM system includes providing a time-domain training symbol having a symmetric distribution and producing the training symbol by transmitting a real-valued PN sequence on each subcarrier under the OOFDM.

In another exemplary aspect, a system for optical communications based on optical orthogonal frequency division multiplexing (OOFDM) and direct detection of OFFDM, comprising a timing synchronization mechanism that provides a time-domain training symbol having a symmetric distribution and produces the training symbol by transmitting a real-valued PN sequence on each subcarrier under the OOFDM.

BRIEF DESCRIPTION OF THE DRAWINGS

FIGS. 3A, 3B, 3C and 3D depict timing metric of various OOFDM synchronization schemes.

DETAILED DESCRIPTION

Figure 1:
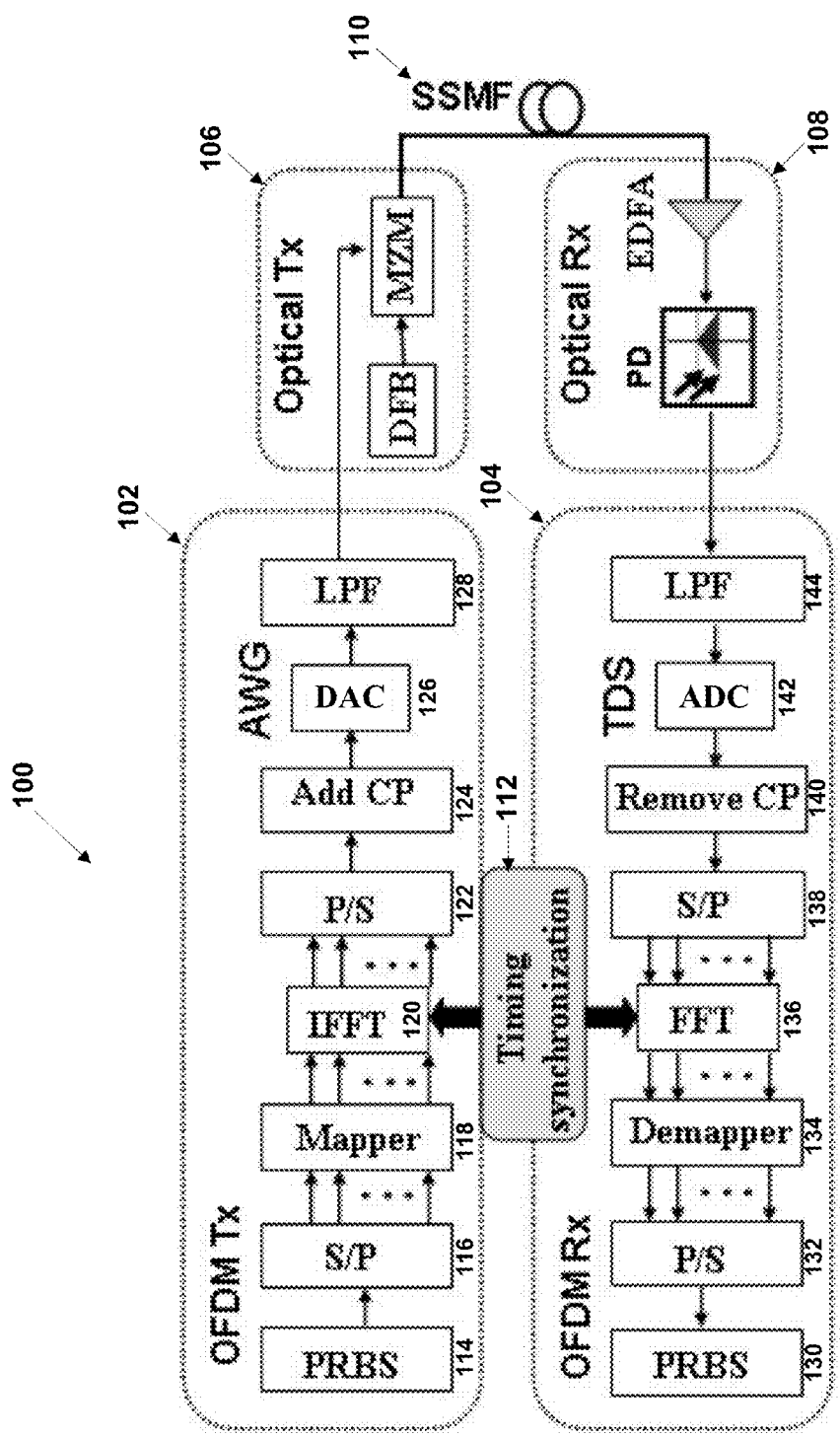
FIG. 1 is a block diagram representation of an optical transceiver.

Optical orthogonal frequency division multiplexing (OOFDM) technology can be implemented in ways that significantly improve the optical transmission system performance due to its good resistance to the chromatic dispersion (CD) and high spectral efficiency. Timing synchronization is a significant technical issue in OFDM systems due to its sensitivity to symbol timing offset and carrier frequency offset.

This patent document provides techniques for timing synchronization in optical communications based on OOFDM and optical communication systems that implement the described timing synchronization techniques. In one implementation, a timing offset estimation method for direct-detection (DD) optical orthogonal frequency division multiplexing (OOFDM) systems is provided. The performance of the proposed method is evaluated in terms of mean and mean-square error (MSE) in one experimental system with 4 Gbits/s DD-OOFDM signal transmission over 100-km standard single mode fiber (SMF). The experimental results show that the proposed method has smaller MSE than the other methods and achieves higher timing estimation accuracy in DD-OOFDM transmission system Several approaches have been proposed to estimate time and frequency offset either jointly or individually in the wireless communication systems. The start of the FFT window timing synchronization needs to be determined properly because an improper FFT window can result in inter-symbol interference (ISI) and thus adversely affect the transmission quality.

One of commonly used timing offset estimate algorithm is initially proposed by Schmidl, entitled "Robust Frequency and Timing Synchronization for OFDM," which is incorporated by reference in its entirety in the present document. In this method, a training symbol containing the same two halves is used to estimate the symbol timing offset. But the timing metric of his method has a plateau, which causes a large variance in the timing estimate.

Another timing offset estimate algorithm is proposed by Minn based on a modification to Schmidl's method. Minn's document is entitled "On Timing Offset Estimation for OFDM Systems" and is incorporated by reference in its entirety in the present document. The Minn method can reduce the uncertainty caused by the timing metric plateau and yields a sharper timing metric and smaller variance that are typically obtained in Schmidl's method. However, the timing metric in Minn method may still be not sufficiently sharp to meet requirements of various applications in optical communications.

Park proposed a new training symbol to avoid the ambiguity which can occur in Schmidl and Minn's methods. Park's document is entitled "A Novel Timing Estimation Method for OFDM Systems and is incorporated by reference in its entirety in the present document. Park's method has an impulse-shaped timing metric, which can be used to achieve a more accurate timing offset estimation.

The techniques for timing synchronization in optical communications based on OOFD provided in this document can be implemented to achieve one or more advantages that may be difficult for the above and other methods. Tests were conducted to experimentally investigate and show the experimental results of these timing synchronization methods used in DD-OOFDM optical fiber transmission system. Our tests indicate that the techniques for timing synchronization in optical communications based on OOFD provided in this document can be better suited for certain optical communication uses, e.g., for optical fiber channel. The experimental results show that the proposed timing synchronization methods produce a sharper timing metric that the timing metric of other methods tested. The example of the timing metric based on the present techniques has only one peak in an OFDM symbol, and obtains smaller mean and MSE than the other methods.

FIG. 1 shows an example of an OOFDM system 100 based on DD-OOFDM. Certain exemplary implementations of various features of the system in FIG. 1 are described in Armstrong's paper, entitled "OFDM for Optical Communications," published in Journal of Lightwave Technology, vol. 27, No. 3, Feb. 1, 2009, which is part of this patent document.

The system 100 includes an OFDM transmitter 102 to generate an analog OFDM signal carrying the original data to be transmitted, an optical transmitter 106 that produces modulated laser light as output OOFDM signal for transmission over fiber, a fiber link or network 110 over which the OOFDM signal is transmitted, an optical receiver 108 that receives the OOFDM signal from the fiber link or network to produce an analog received signal, an OFDM receiver 104 that processes the analog received signal to recover the data. The optical receiver 108 uses a photodetector to directly converts received light with the OOFDM signal into a detector signal without relying on a local oscillator for demodulation. This detection is sometimes called direct detection (DD).

In FIG. 1, a time synchronization mechanism 112 is provided in both the OFDM transmitter 102 and OFDM receiver 104 to provide timing synchronization. In FIG. 1, the timing synchronization processing is implemented in the IFFT module 120 of the OFDM transmitter 102 and FFT module 136 of the OFDM receiver 104.

The pseudorandom binary sequence (PRBS) bits 114 are changed to OFDM baseband signal through OFDM modulation as shown in the OFDM transmitter (Tx) in FIG. 1. The OFDM modulation contains serial-to-parallel (S/P) conversion 116, QPSK modulation 118, pilot insertion (not shown), inverse fast Fourier transform (IFFT) 120, parallel-to-serial conversion (P/S) 122, and adding circle prefix (CP) 124. The digital data sequence is converted to an analogue electrical signal waveform by an arbitrary waveform generator (AWG) serving as a digital to analogue converter (DAC) 126. The electrical baseband OFDM signal is directly modulated on optical carrier. After transmission over standard single-mode fiber (SMF) 110, the OOFDM signal is converted to a baseband OFDM electrical signal after direct detection by a photodiode (PD). The received electrical signal is then sampled by a real-time oscilloscope and is processed off-line for demodulation which is the inverse of the transmitter. The receiver-side may include, e.g., a low pass filter 144, an analog to digital convertor (ADC) 142, a CP removal module 140, a serial to parallel convertor 138, an FFT module 136, a demapper 134, a parallel to serial convertor 132 and a PRBS 130.

Comparison of OFDM Timing Synchronization Methods

OFDM systems tend to be more sensitive to synchronization errors than single carrier systems. OFDM timing synchronization is to find the start of the symbol.

1) Schmidl's Method

The Schmidl method is based on two identical training symbols. The form of the time-domain training symbol proposed by Schmidl is as follows:

$$P_{Sch}=[A_{N/2}A_{N/2}]$$

where $A_{N/2}$ represents samples of length N/2 and is generated by the Schmidl method.

The Schmidl's timing offset estimator finds the starting point of the symbol at the maximum point of the timing metric given by $$M_{Sch}(d) = \frac{|P_1(d)|^2}{(R_1(d))^2} \quad (1)$$

where $$P_1(d) = \sum_{n=0}^{N/2-1} r^*(d+n)r(d+n+N/2) \quad (2)$$

$$R_1(d) = \sum_{n=0}^{N/2-1} |r(d+n+N/2)|^2 \quad (3)$$

The timing metric of Schmidl's method has a plateau (FIG. 3A), which leads to uncertainty regarding the starting point of the OFDM symbol.

2) Minn's Method

In order to alleviate the uncertainty caused by the timing metric plateau and to improve the timing offset estimation, Minn proposed a modified training symbol. Minn's training symbol has the following form:

$$P_{Minn}=[B_{N/4}B_{N/4}-B_{N/4}-B_{N/4}]$$

where $B_{N/4}$ represents a pseudorandom pattern (PN) sequence of length N/4. N is a positive integer divisible by 4.

The timing metric is expressed as $$M_{Minn}(d) = \frac{|p_2(d)|^2}{R_2^2(d)} \quad (4)$$

where $$P_2(d) = \sum_{m=0}^{1}\sum_{n=0}^{N/4-1} r^*\left(d+\frac{N}{2}m+n\right)r\left(d+\frac{N}{2}m+n+\frac{N}{4}\right) \quad (5)$$

$$R_2(d) = \sum_{m=0}^{1}\sum_{n=0}^{N/4-1} \left|r\left(d+\frac{N}{2}m+n+\frac{N}{4}\right)\right|^2 \quad (6)$$

Minn's method uses negative valued samples at the second-half of training symbol to reduce the timing metric plateau, hence resulting in a smaller MSE.

3) Park's Method

Park's method can be used to avoid or reduce the ambiguity which occurs in Schmidl's and Minn's methods. Park's training symbol is designed to be of the form $$P_{Minn}=[A_{N/4}B_{N/4}A^*_{N/4}B^*_{N/4}]$$

where $A_{N/4}$ represents samples of length N/4, generated by IFFT of a PN sequence, and $A^*_{N/4}$ represents a conjugate of $A_{N/4}$, $B_{N/4}$ is designed to be symmetric with $A_{N/4}$.

To make use of the property that $A_{N/4}$ is symmetric with $B_{N/4}$, Park defined the timing metric as follows:

$$M_{Park}(d) = \frac{|p_3(d)|^2}{R_3^2(d)} \quad (7)$$

where $$P_3(d) = \sum_{n=0}^{N/2-1} r(d+n)r(d-n) \quad (8)$$

$$R_3(d) = \sum_{n=0}^{N/2-1} |r(d+n)|^2 \quad (9)$$

When used in a wireless channel, Park's method has an impulse-shaped timing metric. But in the non-coherent OOFDM system, one of the prominent differences is the existence of fiber channel nonlinearity and its intricate interaction with fiber dispersion, which is nonexistent in the wireless systems. Notably, only the real valued signal is transmitted through SMF channel and the conjugate symmetric property of training symbol is destroyed. Therefore, it can be assumed that performance of Park's method is inferior to its performance in the wireless channel.

Based on the characteristics of OOFDM systems using IM/DD, a new timing synchronization method is disclosed here and is based on modifications to other methods described above. The modified time-domain training symbol is as follows:

$$P_{Pro} = [aA_{N/2-1} bB_{N/2-1}]$$

In the above equation "a" can be a random value, such as 1+i or another value. The value of "b" is also another random value, such as 1+i or another value, which may be the same or different from "a." $A_{N/2-1}$ and $B_{N/2-1}$ are training sequences with length of N/2−1 each, and the total length for a, $A_{N/2-1}$, b and $A_{N/2-1}$ is N. Furthermore, $A_{N/2-1}$ and $B_{N/2-1}$ are symmetrical with the center of b. In other words, $A_{N/2-1}$ and $B_{N/2-1}$ "reflect" around b. As a non-limiting example, if $A_{N/2-1}$ is 1111000, then $B_{N/2-1}$ will be 0001111, and the total length N will be 7+7+1+1=16. To put it differently, the portion $A_{N/2-1}$, b and $B_{N/2-1}$ is an odd-length palindromic sequence of values (reads the same from right to left and from left to right).

This symbol pattern can be easily obtained by using the properties of IFFT. The training symbol is produced by transmitting a real-valued PN sequence on each subcarrier. Timing metric is defined as follows:

$$M_{Pro}(d) = \frac{|p_4(d)|^2}{R_4^2(d)} \quad (10)$$

where $$P_4(d) = \sum_{n=1}^{N/2-1} r(d+n)r(d-n) \quad (11)$$

$$R_4(d) = \frac{1}{2} \sum_{n=1}^{N/2-1} [|r(d+n)|^2 + |r(d-n)|^2] \quad (12)$$

The $P_4(d)$ is designed so that there are different pairs of product between two adjacent values. It has its maximum different pairs of product. Therefore, the timing metric obtained using the disclosed method has its peak value at the correct symbol timing points, while the values are almost zero at other positions.

Experimental Setup and Results

Figure 2:
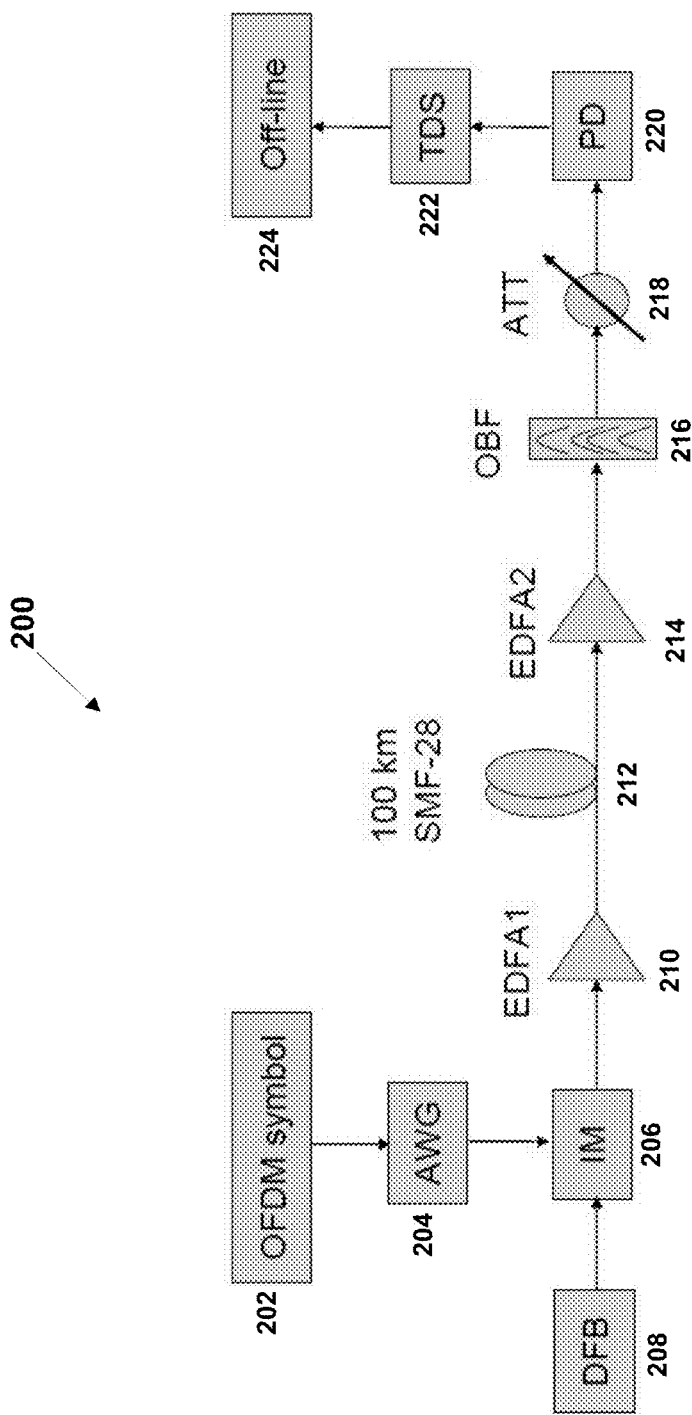
FIG. 2 depicts an optical orthogonal frequency division multiplexing (OOFDM) transmission system.

FIG. 2 shows a DD-OOFDM system 200. In this system, the number of OFDM subcarriers is 256 while the subcarriers used for data, pilots and guard intervals are 192, 8 and 56, respectively. The CP is ⅛ of an OFDM period which would be 32 samples in every OFDM frame. QPSK modulation scheme is employed for subcarriers modulation scheme. The OFDM modulation of the digital data is implemented offline using MATLAB program. The analog electrical signals to be transmitted are generated by a Tektronix AWG. The bit rate in the system 200 is 4 Gb/s. A continuous-wave (CW) lightwave with the output power of 7 dBm is generated from a commercial distributed-feedback (DFB) laser 208 at 1543.52 nm, and the CE light is modulated by analog electrical OFDM signals to generate the OOFDM signal by an optical intensity modulator 206. The optical OFDM signal is amplified to be 8.3 dBm by one EDFA 210 before transmission. After transmission over 100-km SMF-28 212, the optical signal is preamplified by the anther EDFA 214 to 6.3 dBm, and then filtered by a 1 nm bandwidth optical bandpass filter 216. At the receiver, the optical OFDM signal gets optical-to-electrical (O/E) conversion via a commercial optical receiver of HP83433, which is the type of PIN with a 3-dB bandwidth of 10 GHz. The power of the detected optical signal can be changed with a tunable attenuator (ATT) 218. The converted electrical OFDM signal 220 is sampled by the Tektronix real-time oscilloscope 222 and stored for processing off-line in MATLAB 214.

FIGS. 3A, 3B, 3C and 3D show examples of the timing metrics in various methods described above after transmission over 100-km SMF with 256 subcarriers and 32 CP. The graphs 302, 304, 306 and 308 are drawn with the horizontal axis 300 representing time samples and the vertical axis 301 representing Timing metric. As seen in the FIG. 3A, graph 302, Schmidl's method creates a plateau for the whole interval of CP (the flat peak around time samples 1600).

As depicted in FIG. 3B, the timing metric from Minn's method reduces the plateau, and yields a sharp timing metric, but still includes a smaller plateau, similar to Schmidl. In OOFDM system using IM/DD in SMF channel, the performance of Schmidl and Minn's method is similar to the performance while used in wireless OFDM system.

Compared to the first two algorithms, Park's method has better performance, but from FIG. 3C, it can see that there are some small peaks beside the right FFT starting point. As analyzed before, only real valued signal is transmitted through optical channel and the conjugate symmetric property of training symbol is destroyed. Therefore, its performance is secondary to its performance in the wireless channel.

FIG. 3D shows the experimental results of the disclosed method in DD-OOFDM system. As expected from the previously discussed analysis, its timing metric curve has very clear single peak, therefore it achieves a more accurate timing offset estimation.

The performance of the proposed timing estimator is evaluated by mean and MSE, and is compared with those of Schmidl's, Minn's and Park's methods. The measured means and MSE curves versus the received optical signal power are shown in FIGS. 4-7. We compared the means and variances for the timing offset estimators at BTB case and after 100-km SMF-28 transmission.

Figure 4:
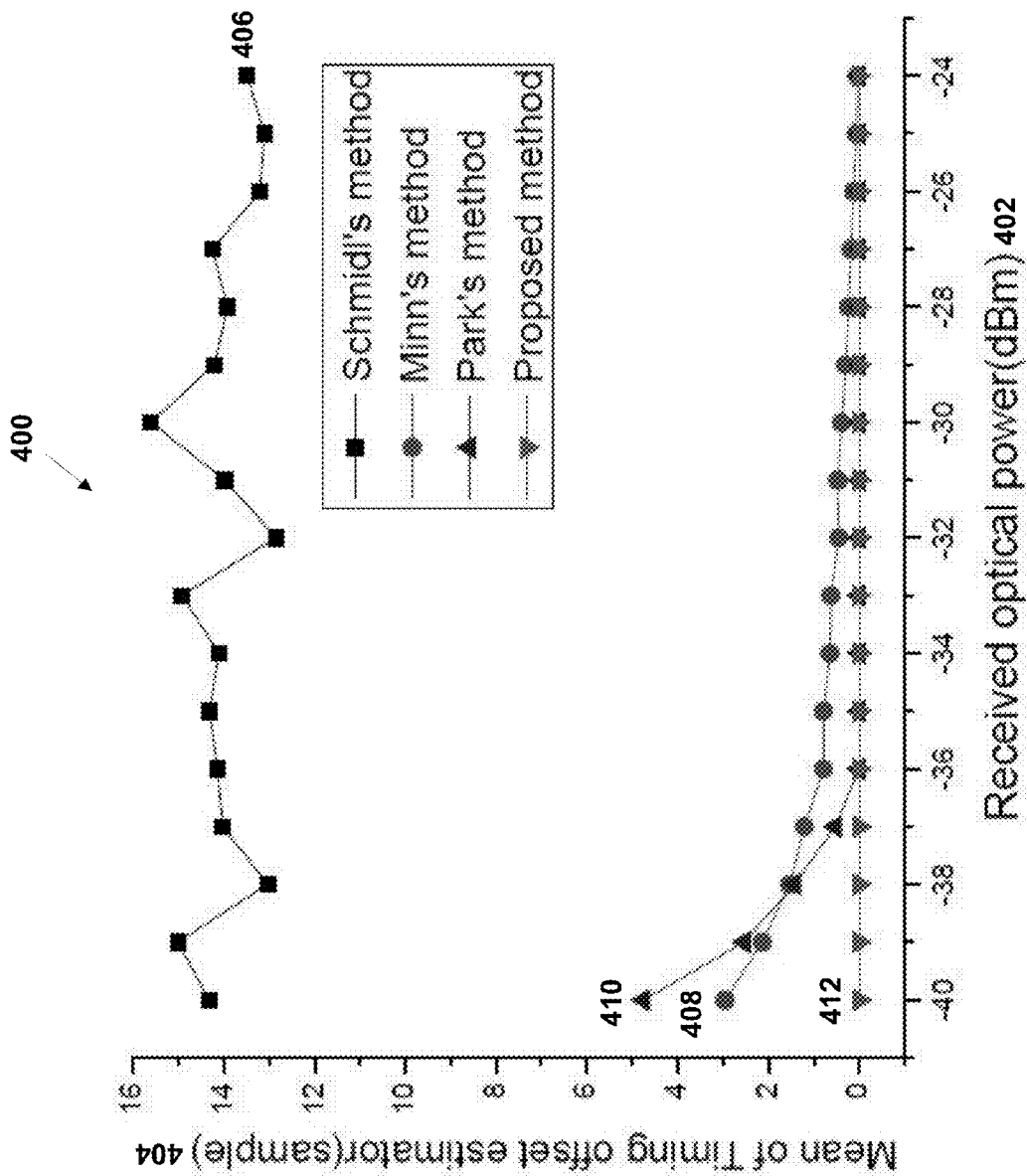
FIG. 4 is a graph illustrating mean value of timing offset for various OOFDM synchronization schemes.

FIG. 4 depicts a graph 400 in which mean value of timing offset estimators are plotted versus the received power for the back-to-back (i.e., receiver immediately after the transmitter) cases. The horizontal axis represents 402 received optical power and the vertical axis 404 represents mean of timing offset estimator. The curve 406 is for Schmidl's method. The curve 408 is for Minn's method. The curve 410 is for Park's method. The curve 412 depicts performance of the disclosed method.

Figure 5:
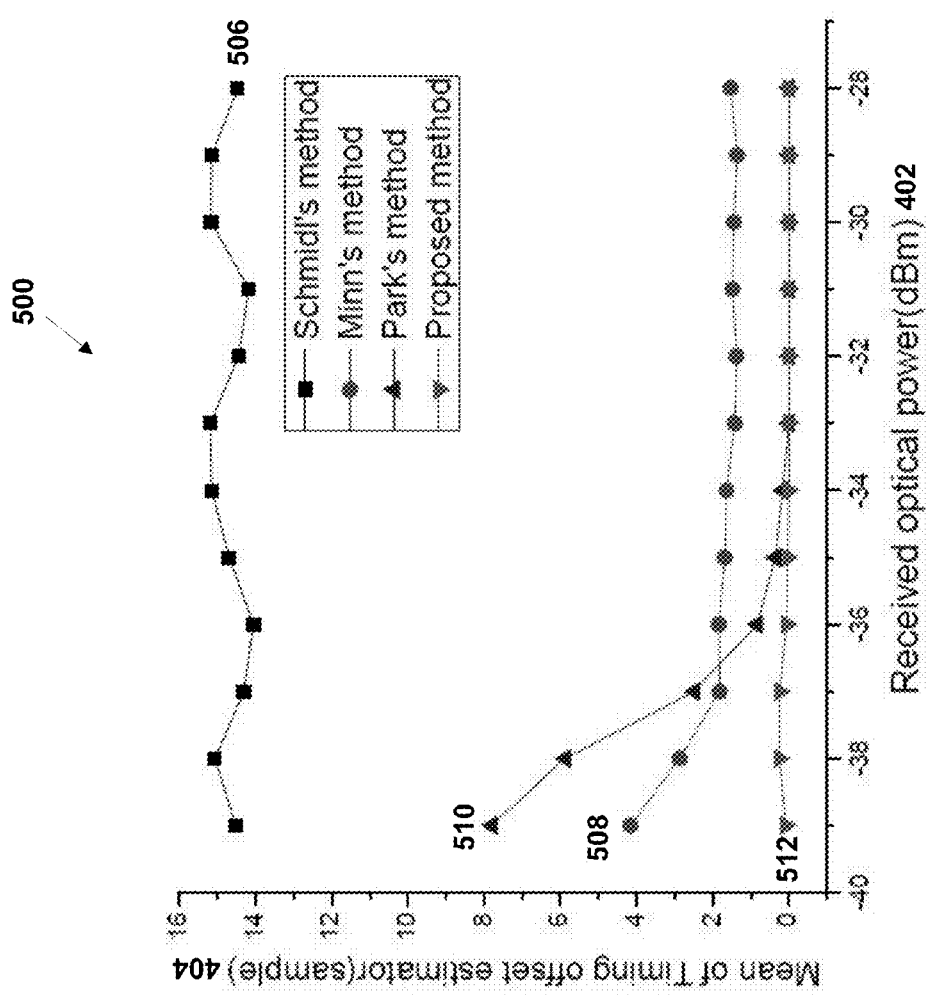
FIG. 5 is a graph illustrating mean value of timing offset for various OOFDM synchronization schemes.

FIG. 5 depicts a graph 500 in which mean value of timing offset estimators are plotted versus the received power for after transmission over 100-km SMF-28. The horizontal axis represents 402 received optical power and the vertical axis 404 represents mean of timing offset estimator. The curve 506 is for Schmidl's method. The curve 508 is for Minn's method. The curve 510 is for Park's method. The curve 512 depicts performance of the disclosed method.

Figure 6:
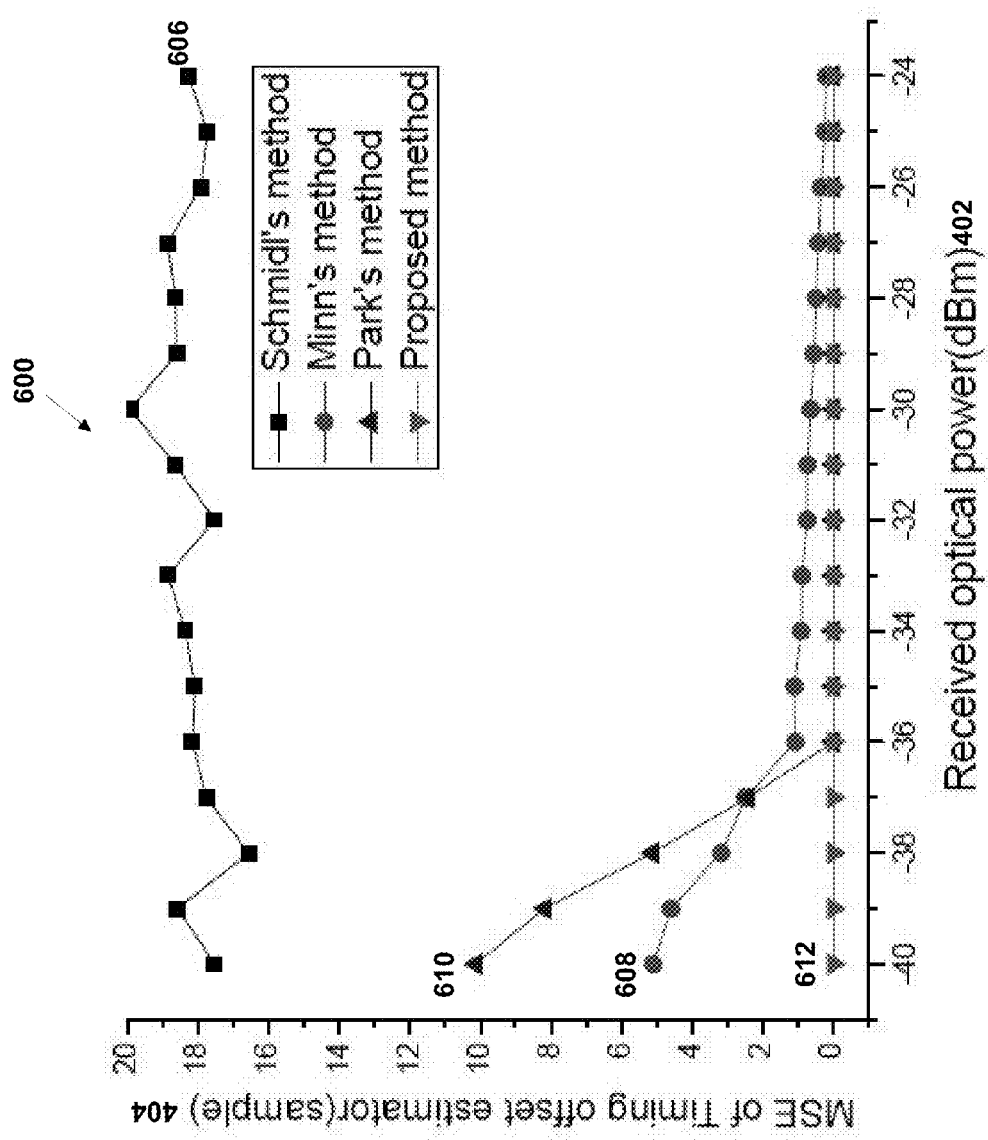
FIG. 6 is a graph illustrating mean square error of timing offset for various OOFDM synchronization schemes.

FIG. 6 depicts a graph 600 in which MSE of timing offset estimators versus the received power for the back-to-back case are plotted. The horizontal axis represents 402 received optical power and the vertical axis 404 represents mean of timing offset estimator. The curve 606 is for Schmidl's method. The curve 608 is for Minn's method. The curve 610 is for Park's method. The curve 612 depicts performance of the disclosed method.

Figure 7:
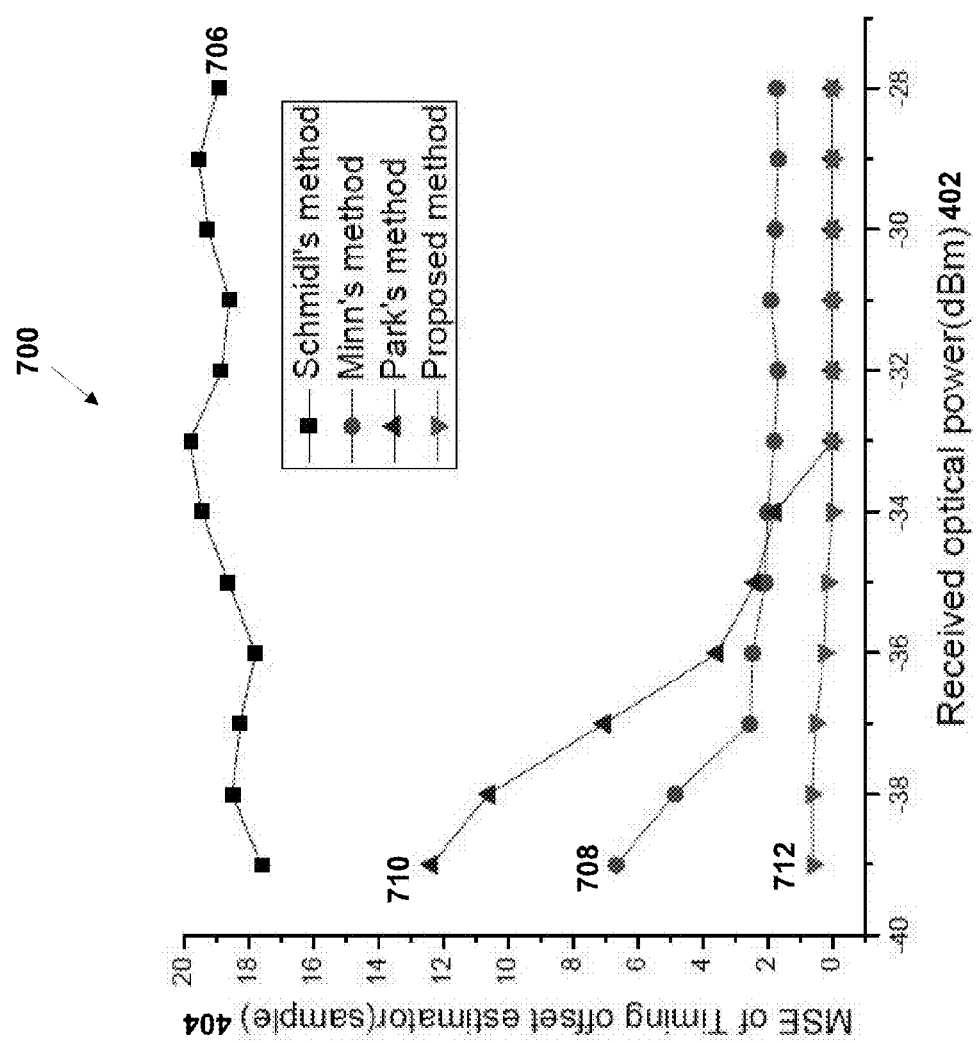
FIG. 7 is a graph illustrating mean square error of timing offset for various OOFDM synchronization schemes.

FIG. 7 depicts a graph 700 in which timing offset estimators versus the received power after transmission over 100-km SMF-28 are plotted. The horizontal axis represents 402 received optical power and the vertical axis 404 represents mean of timing offset estimator. The curve 706 is for Schmidl's method. The curve 708 is for Minn's method. The curve 710 is for Park's method. The curve 712 depicts performance of the disclosed method.

The data for the mean and MSE curve in FIG. 4 to FIG. 7 indicates that the proposed timing offset estimator has much smaller mean and MSE than the other estimators when the receiving power is low. This improvement can be inferred from the impulse-like shape of the timing metric of proposed method. As analyzed before, the existence of fiber channel nonlinearity and its intricate interaction with fiber dispersion which lead to the uncertainty of timing offset estimation. As seen in the FIGS. 3A, 3B, 3C and 3D, the disclosed method's timing metric curve has a clear single peak which makes it has good resistance to the chromatic dispersion and nonlinearity in fiber channel. However, the other three methods do not have a single sharp timing metric, so the proposed method can obtain higher timing estimation accuracy than the other three methods when the receiving power is low.

Figure 8:
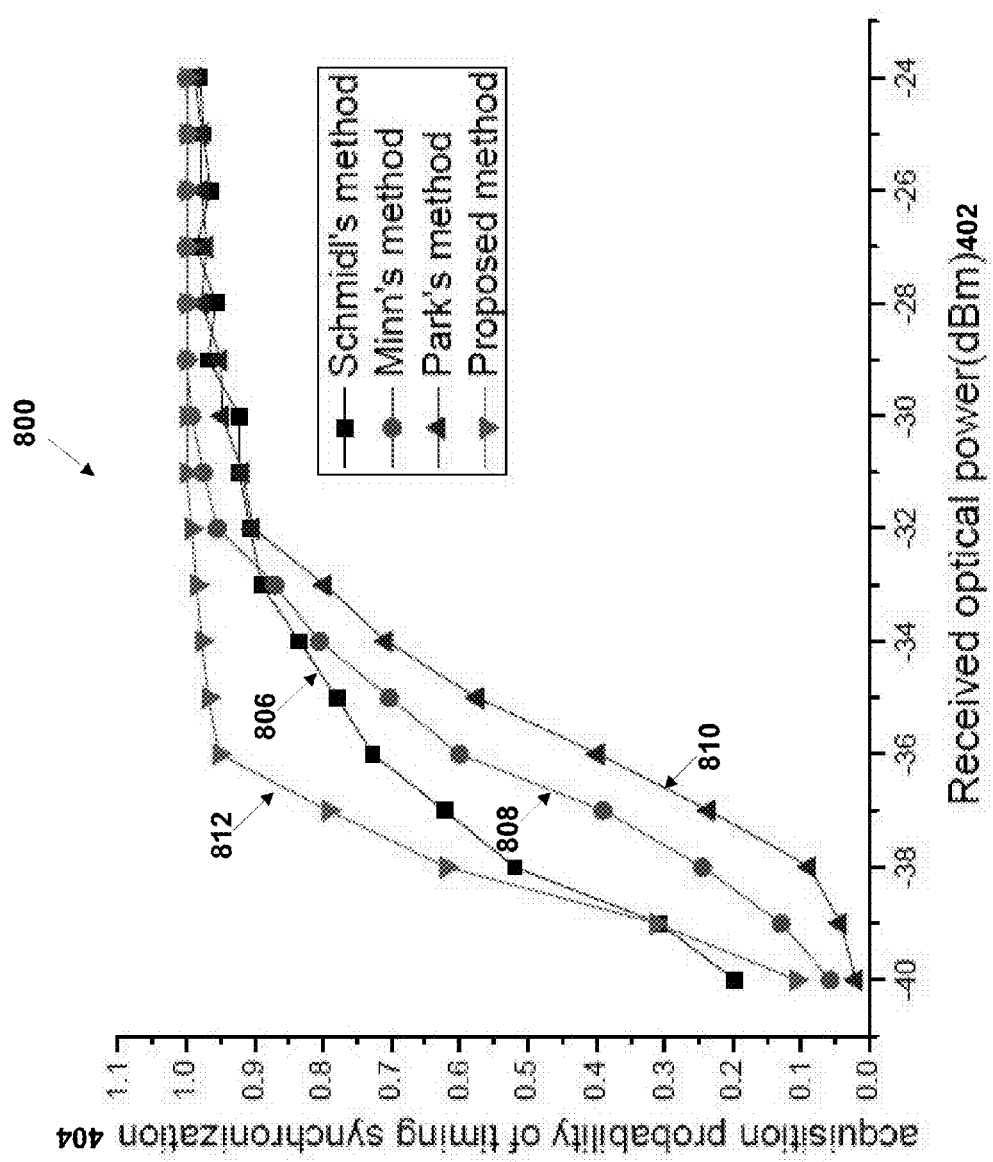
FIG. 8 is a graph illustrating acquisition probability curves for various OOFDM synchronization schemes.
Figure 9:
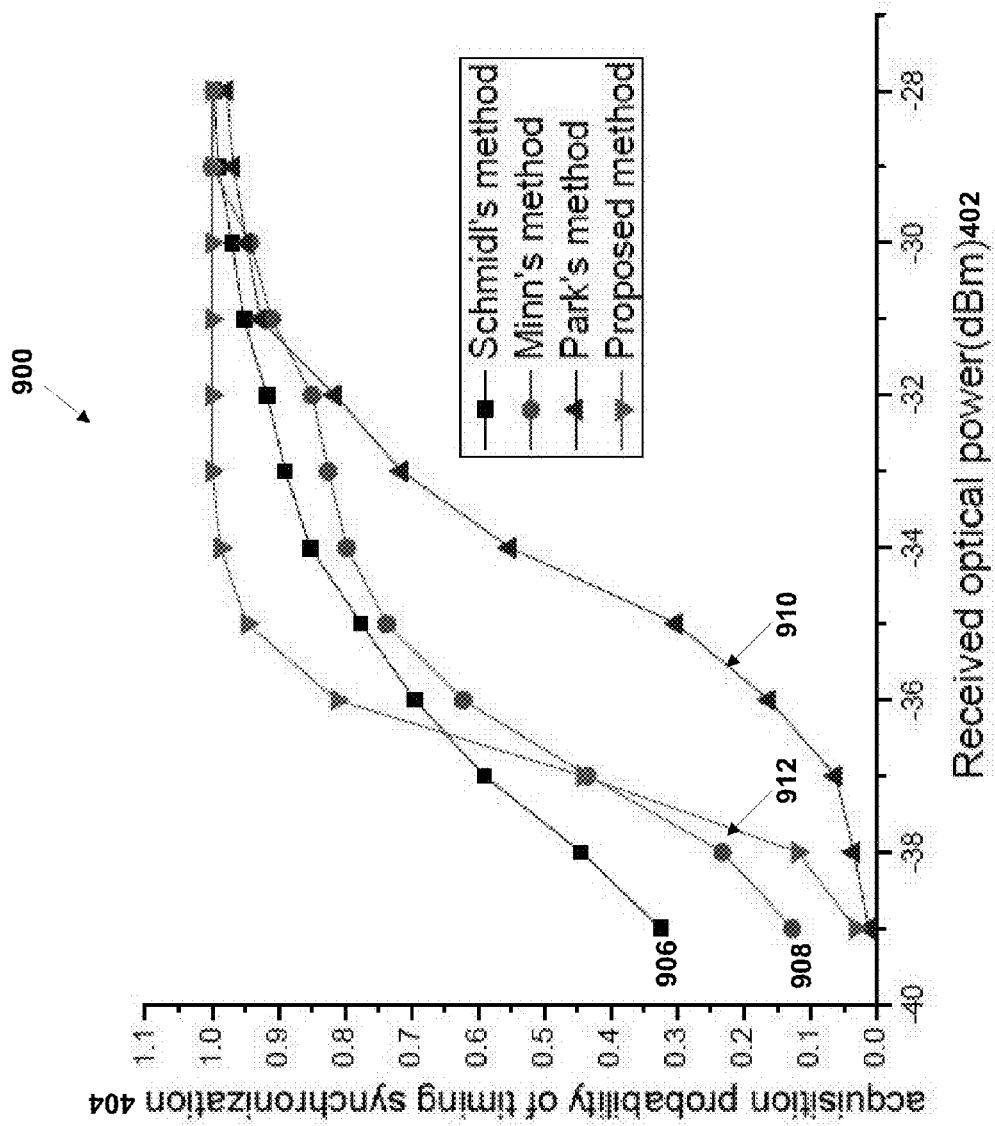
FIG. 9 is a graph illustrating acquisition probability curves for various OOFDM synchronization schemes.

Over 400 tests were conducted in each receiving power points, and the correct number of synchronization was recorded. FIG. 8 and FIG. 9 show the probability of obtaining exact symbol timing for timing offset estimators at back-to-back (BTB) and after 100-km SMF transmission. It is clearly shown that the acquisition probability of the disclosed method is higher than the other methods though it will drop with the decreasing receiving power.

FIG. 8 depicts a graph 800 showing curves of acquisition probability of timing synchronization versus the received power for the back-to-back case. The curve 806 is for Schmidl's method. The curve 808 is for Minn's method. The curve 810 is for Park's method. The curve 812 depicts performance of the disclosed method.

FIG. 9 depicts a graph 900 showing curves of acquisition probability of timing synchronization versus the received power for after transmission over 100-km SMF-28. The curve 906 is for Schmidl's method. The curve 908 is for Minn's method. The curve 910 is for Park's method. The curve 912 depicts performance of the disclosed method.

Figure 10:
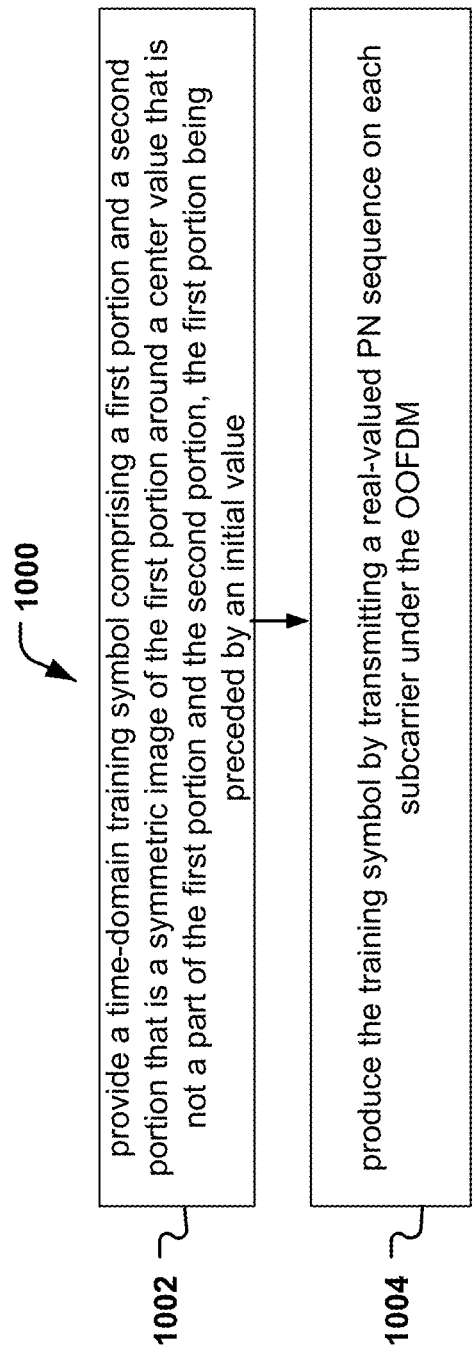
FIG. 10 is a flowchart representation of a method of optical communication.

FIG. 10 is a flowchart representation of a process 1000 of optical communication. The process 1000 may be implemented in an optical orthogonal frequency division multiplexing (OOFDM) system. At 1002, a time-domain training symbol comprising a first portion (e.g., previously described B) and a second portion that is a symmetric image of the first portion (e.g., A) around a center value (e.g., b) that is not a part of the first portion and the second portion, the first portion being preceded by an initial value (e.g., a), is provided. At 1004, the training symbol is produced by transmitting a real-valued pseudorandom (PN) sequence on each subcarrier in the OOFDM. In some implementations, the center value and the initial value are independent of each other.

Figure 11:
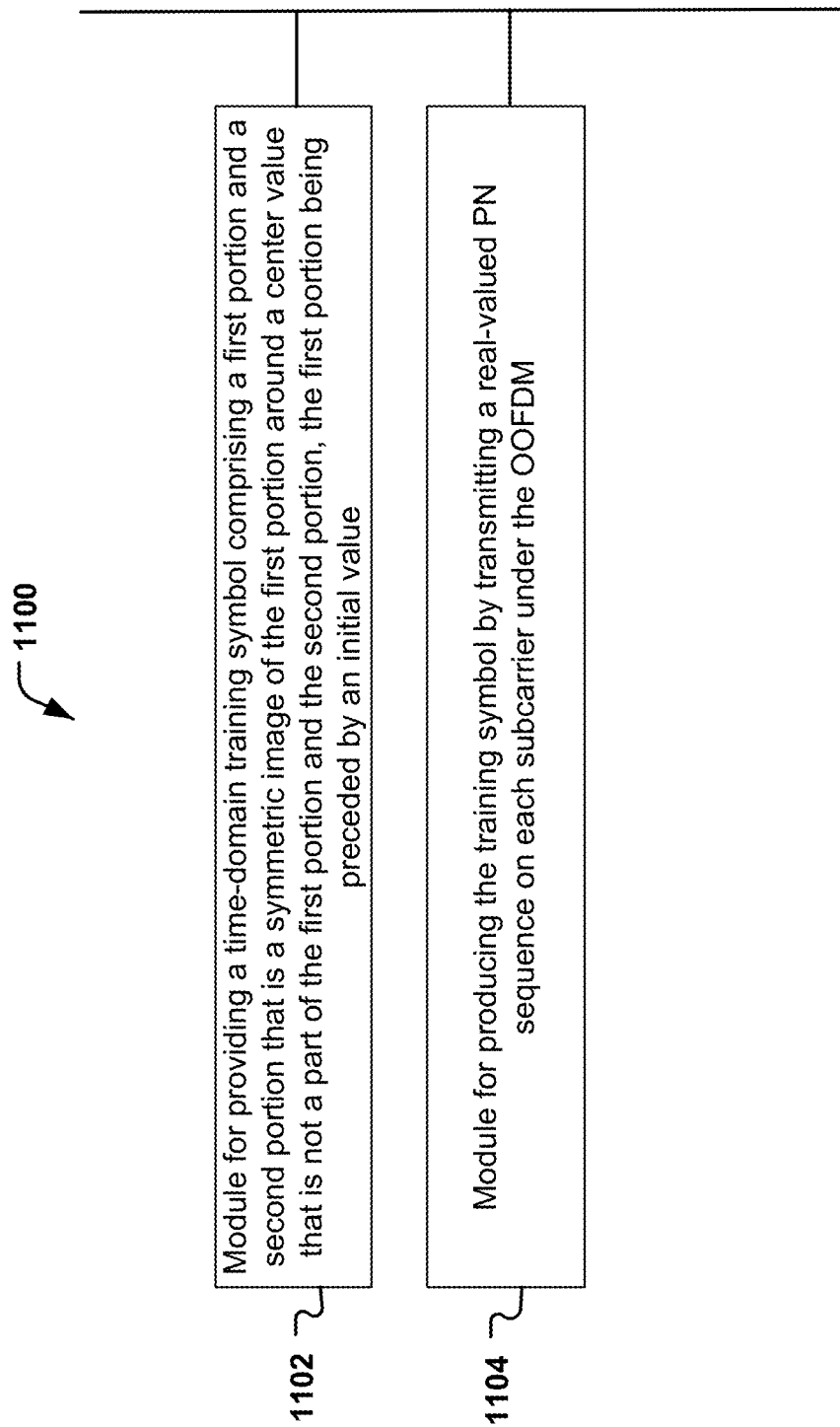
FIG. 11 is a block diagram representation of an apparatus for optical communications.

FIG. 11 is a block diagram representation of an apparatus 1100 for optical communications. The module 1102 is for providing a time-domain training symbol comprising a first portion and a second portion that is a symmetric image of the first portion around a center value that is not a part of the first portion and the second portion, the first portion being preceded by an initial value. The module 1104 is for producing the training symbol by transmitting a real-valued PN sequence on each subcarrier under the OOFDM.

We have theoretically and experimentally investigated different timing synchronization methods in DD-OOFDM system. The experimental results show that the proposed timing synchronization method makes it possible to estimate symbol timing offset with much smaller MSE and higher acquisition probability. Therefore, the proposed estimator is suitable for the initial timing synchronization of OOFDM systems.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for computing timing synchronization in an optical communication system based on optical orthogonal frequency division multiplexing (OOFDM) and direct detection of OOFDM, comprising:
   providing a time-domain training symbol comprising a first portion and a second portion that is a symmetric image of the first portion around a center value that is not a part of the first portion and the second portion, the first portion being preceded by an initial value; and
   producing the training symbol by transmitting a real-valued PN sequence on each subcarrier under the OOFDM.

2. The method of claim 1, wherein the center value and the initial value are independent of each other.

3. The method of claim 1, further comprising, generating an OOFDM signal using digital to analog conversion.

4. The method of claim 3, further comprising transmitting the OOFDM transmission on an optical communications link.

5. An apparatus for computing timing synchronization in an optical communication system based on optical orthogonal frequency division multiplexing (OOFDM) and direct detection of OOFDM, comprising:
   a symbol provider that provides a time-domain training symbol comprising a first portion and a second portion that is a symmetric image of the first portion around a center value that is not a part of the first portion and the second portion, the first portion being preceded by an initial value; and
   a symbol producer that produces the training symbol by transmitting a real-valued PN sequence on each subcarrier under the OOFDM.

6. The apparatus of claim 5, wherein the center value and the initial value are independent of each other.

7. The apparatus of claim 5, further comprising, a signal generate that generates an OOFDM signal using digital to analog conversion.

8. The apparatus of claim 7, further comprising an optical transmitter that transmits the OOFDM transmission on an optical communications link.

9. An apparatus, comprising:
   a memory for storing instructions; and
   a processor for reading the instructions and executing the instructions to implement a procedure for computing timing synchronization in an optical communication system based on optical orthogonal frequency division multiplexing (OOFDM) and direct detection of OOFDM, comprising:
      providing a time-domain training symbol comprising a first portion and a second portion that is a symmetric image of the first portion around a center value that is not a part of the first portion and the second portion, the first portion being preceded by an initial value; and
      producing the training symbol by transmitting a real-valued PN sequence on each subcarrier under the OOFDM.

10. The apparatus of claim 9, wherein the center value and the initial value are independent of each other.

11. The apparatus of claim 9, wherein the procedure further comprises generating an OOFDM signal using digital to analog conversion.

12. The apparatus of claim 10, wherein the procedure further comprising transmitting the OOFDM transmission on an optical communications link.

13. A method for estimating timing synchronization in an optical communication system based on optical orthogonal frequency division multiplexing (OOFDM) and direct detection of OOFDM, comprising:
   receiving an optical signal comprising a training symbol, the training symbol comprising, in time domain, a first portion that includes an odd number of values and a second portion that comprises a palindromic value sequence having an odd length greater than 1; and
   synchronizing timing of the received optical signal based on the training symbol.

14. The method of claim 13, wherein the training symbol is generated by transmitting a real-valued PN sequence on each subcarrier under the OOFDM.

15. The method of claim 13, further comprising:
   generating demodulated data.

16. An apparatus for estimating timing synchronization in an optical communication system based on optical orthogonal frequency division multiplexing (OOFDM) and direct detection of OOFDM, comprising:
   means for receiving an optical signal comprising a training symbol, the training symbol comprising, in time domain, a first portion that includes an odd number of values and a second portion that comprises a palindromic value sequence having an odd length greater than 1; and
   means for synchronizing timing of the received optical signal based on the training symbol.

17. The apparatus of claim 16, wherein the training symbol is generated by transmitting a real-valued PN sequence on each subcarrier under the OOFDM.

18. The apparatus of claim 16, further comprising:
means for generating demodulated data.

19. A system for optical communication comprising an optical transmitter apparatus and an optical receiver apparatus,
wherein the optical transmitter apparatus includes:
a symbol provider that provides a time-domain training symbol comprising a first portion and a second portion that is a symmetric image of the first portion around a center value that is not a part of the first portion and the second portion, the first portion being preceded by an initial value; and
a symbol producer that produces the training symbol by transmitting a real-valued pseudorandom sequence on each subcarrier of an optical orthogonal frequency division multiplexed (OOFDM) signal; and wherein the optical receiver apparatus:
receives the optical OOFDM signal; and
synchronizes timing of the received optical OOFDM signal based on the training symbol.

20. An optical communication apparatus, comprising:
a memory for storing instructions; and
a processor for reading the instructions and executing the instructions to implement a method for estimating timing synchronization in an optical communication system based on optical orthogonal frequency division multiplexing (OOFDM) and direct detection of OOFDM, comprising:
receiving an optical signal comprising a training symbol, the training symbol comprising, in time domain, a first portion that includes an odd number of values and a second portion that comprises a palindromic value sequence having an odd length greater than one; and
synchronizing timing of the received optical signal based on the training symbol.

* * * * *